INTERFERENCE SIGNAL CANCELLING SYSTEM FOR AN INTEGRATING ANALOG TO DIGITAL CONVERTER

Filed June 22, 1965

INVENTORS
PAUL M. HAAS
RICHARD L. KNOX
BY
Richard L. Macneil

United States Patent Office 3,526,888
Patented Sept. 1, 1970

3,526,888

INTERFERENCE SIGNAL CANCELLING SYSTEM FOR AN INTEGRATING ANALOG TO DIGITAL CONVERTER

Richard L. Knox and Paul M. Haas, San Diego, Calif., assignors, by mesne assignments, to Solitron Devices, Inc., Tappan, N.Y., a corporation of New York Filed June 22, 1965, Ser. No. 465,911
Int. Cl. H03k *13/02*
U.S. Cl. 340—347 3 Claims

ABSTRACT OF THE DISCLOSURE

There is disclosed a system for cancellation of AC signals which are superimposed upon a DC analog signal which is being measured by an integrator. The AC signal is cancelled by alternately integrating the AC signal in out-of-phase relationship. The alternate integration is controlled by suitable logic circuitry.

Figure 1:
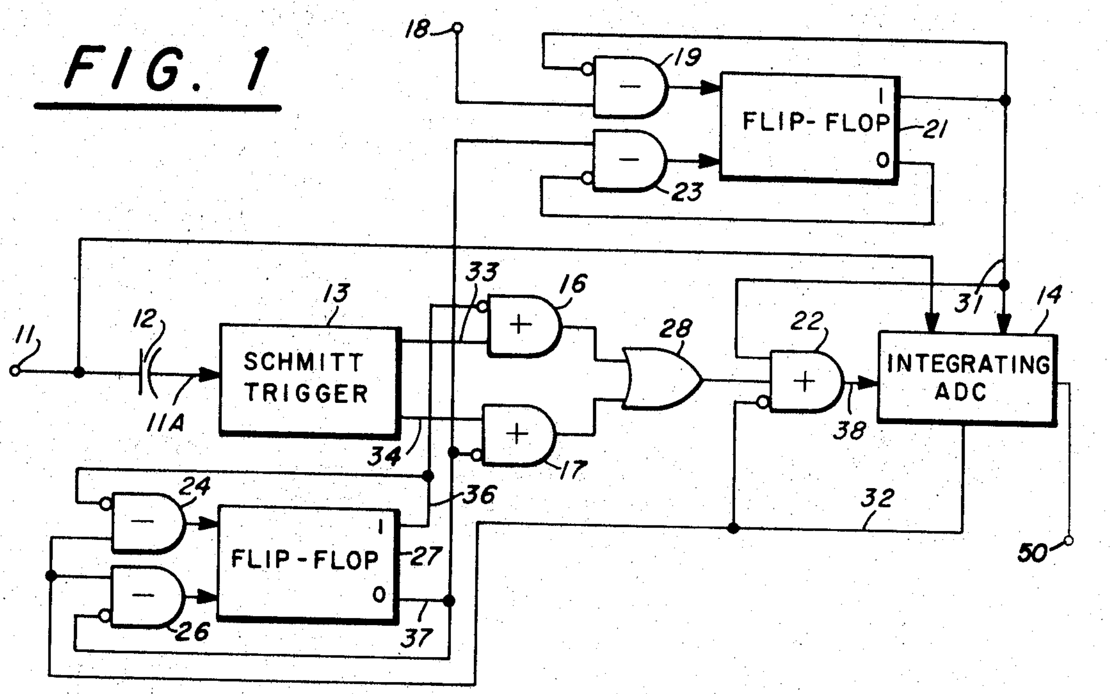

The present invention relates to integrating analog to digital converters, and more particularly to integrating analog to digital converters with interference signal cancelling.

A problem has existed in integrating analog to digital converters of the type where an analog signal is presented at the input and the analog signal integrated for a predetermined time. Any AC interference signal superimposed on the DC analog potential will create errors in the reading unless the cycle time of the analog to digital converter is started at a zero crossing of the interference signal, and stopped at a zero crossing of the interference signal, i.e., resulting in an even number of cycles of the interference signal, which in turn would not affect the output reading. Since this is difficult and expensive to implement, an alternative solution to the problem has been found in starting a first cycle time with a zero-crossing of the interference signal in one direction, and starting a second cycle time with a zero-crossing of the interference signal in the other direction. If the total of the two cycle times is treated as one readout, any error resulting from the instantaneous amplitude of the interference signal at the end of each cycle time will cancel.

According to the invention, a zero-crossing detector such as Schmitt trigger circuit is AC coupled to the analog input of interest. The zero-crossing detector is designed to change states at zero-crossings of its input potential. This will result in an output from the zero-crossing detector of the same frequency as the interfering signal. This output is utilized to insure the starting of the integration period of an integrating analog to digital converter in coincidence with the zero-crossing in a predetermined direction of an interfering signal. The analog to digital converter is then allowed to integrate during its normal cycling period, the end of which is utilized to inhibit the start system until a signal from the zero-crossing detector resulting from a zero-crossing in the opposite direction of the interference signal occurs. Again, the integrating analog to digital converter goes through its normal cycle period. If the calibration or output reading of the analog to digital converter is cut in half, it will then read the average of the two readings, at which time any error introduced from the interference signal being superimposed on the analog signal of interest will cancel. Further refinements include a reset line inhibit circuit to insure that the analog to digital converter cannot be reset until the second or two complete cyclings have occurred.

An object of the present invention is the provision of an analog to digital converter interference signal error cancelling system.

A further object of the invention is the provision of an interference signal cancelling system for integrating analog to digital converters which will cancel interference signal error over a wide range of interference signal frequencies.

Figure 2:
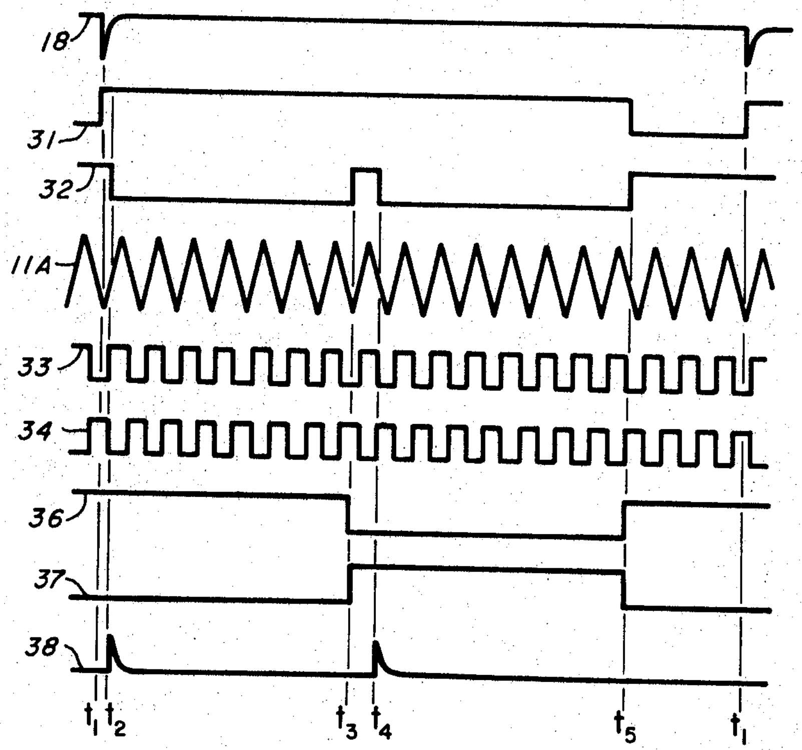

Other objects and many of the attendant advantages of this invention will be readily appreciated as the same becomes better understood by reference to the following detailed description when considered in connection with the accompanying drawings in which like referenced numerals designate like parts throughout the figures thereof, and wherein:

FIG. 1 is a diagram of preferred embodiment of the present invention in block form; and FIG. 2 illustrates various wave forms present throughout the diagram illustrated in FIG. 1.

Referring to FIG. 1, input terminal 11 is connected through capacitor 12 to an input of Schmitt trigger 13. Terminal 11 is further connected to an analog input of integrating analog to digital converter 14. An output 33 of Schmitt trigger 13 is coupled to a signal input of And gate 16 and another output 34 of Schmitt trigger 13 is coupled to a signal input of And gate 17. Input terminal 18 is connected to a signal input of And gate 19, the output of which is connected to one input of flip flop 21. One output of flip flop 21 is connected to an enable input of And gate 19, as a reset inhibit to integrating analog to digital converter 14, and as an enable input to And gate 22. Another output of flip flop 21 is connected to an enable input of And gate 23. A timing output from integrating analog to digital converter 14 is connected as another enable input to And gate 22 and to signal inputs of And gates 24 and 26. The outputs of And gates 24 and 26 are connected as trigger inputs to flip flop 27. Output 37 of flip flop 27 is connected as an enable input to And gates 17 and 26, and as a signal input to And gate 23, the output of which is connected to another input of flip flop 21. Output 36 of flip flop 27 is connected as an enable input to And gates 16 and 24. The outputs of And gates 16 and 17 are connected through Or gate 28 to a signal input of And gate 22, the output of which is connected as a start input to integrating analog to digital converter 14. Output terminal 50 is provided for obtaining the output reading.

Referring to FIG. 2, wave forms 18, 31, 32, 11A, 33, 34, 36, 37 and 38 are shown as they appear at the circuit identified with corresponding numbers in FIG. 1. These wave forms are referenced to times T1, T2, T3, T4 and T5.

OPERATION

Quiescently, before a trigger pulse is applied at input terminal 18, flip flop 21 has an output at 31 which is negative with respect to its other output. And gate 19 is enabled by a negative signal applied to its enable input. The negative sign in And gate 19, 23, 24 and 26 indicate this condition, and the positive signs in And gates 16, 17 and 22 indicate the reverse, i.e., a positive enable signal necessary for coincidence or an output. It is also pointed out that all of the And gates in the circuit are of the differentiating type, i.e., a leading or trailing edge of a signal applied to their signal inputs is all that is seen, their operation depending upon the indicated polarity.

At the analog input terminal 11 there is applied a signal substantially similar to wave form 11A of FIG. 2 which is drawn as a triangular wave form in the interest of clarity. It is to be understood that this refers to any substantially periodic wave form which may appear superimposed on a DC analog signal voltage of interest. Since the object of an integrating analog to digital converter is to produce a digital indication of the DC analog potential present at its input, it becomes desirable to eliminate this interference signal, seen as wave form 11A, in FIG. 2, and this is the purpose of the logic shown in FIG. 1.

Coupling capacitor 12 removes the analog potential from the input to Schmitt trigger 13, leaving only the AC interference signal applied to its input. Schmitt trigger 13 is designed to trigger at zero-crossings of its input trigger signal, i.e., it will reverse states at each zero-crossing thus functioning as a zero-crossing detector. This is illustrated by wave forms 33 and 34 of FIG. 2, the change of state of Schmitt trigger 13 occurring at zero-crossings of wave form 11A. It is pointed out here that outputs 33 and 34 of Schmitt trigger 13, are of opposite phase or polarity. Since these outputs are applied as signal inputs to And gates 16 and 17, only one of these wave forms will be passed at a given time, depending upon the condition of flip flop 27.

Quiescently, output 36 of flip flop 27 will enable And gate 16, and output 37 of flip flop 27 will inhibit And gate 17, thereby passing output 33 of Schmitt trigger 13 through AND gate 16, and Or gate 28 to the signal input of And gate 22. Output 31 of flip flop 21 inhibits And gate 22, and the system is ready for a start trigger pulse to be applied at input terminal 18.

At time T1 a negative going input trigger signal is applied at input terminal 18, which is passed through And gate 19 to reverse the condition of flip flop 21. At this time, output 31 of flip flop 21 exhibits a relatively positive signal and inhibits And gate 19 to prevent any spurious triggering. Output 31 also inhibits the internal reset signal of the integrating analog to digital converter 14. Moreover, output 31 enables And gate 22. The other output from flip flop 21 enables And gate 23. At time T1, output 33 exhibits a negative signal whereby gate 16 is inoperative. Similarly, gate 17 is disabled by the negative signal at output 37. The next zero crossing of the interference signal 11A at input terminal 11 occurs at time T2. This zero crossing reverses the state of Schmitt trigger 13 and provides a positive signal at output 33 thereby passing a pulse through And gate 16, OR gate 28, and And gate 22 to start the timing cycle of the integrating analog to digital converter 14. It is pointed out that at time T1 the second enabling signal at And gate 22 is provided by timing signal 32 from integrating analog to digital converter 14. At time T2 timing signal 32 is reversed, however, which inhibits And gate 22 during the integrating period of digital volmeter 14, and prevents any spurious triggering from output 38 of And gate 22.

At time T3, the first half of the timing cycle of analog to digital converter 14 is over, and output 32 thereof goes positive, thereby enabling And gate 22 again, and switching flip flop 27 to its opposite state. Since gate 17 is now enabled by a positive signal at output 37 and gate 16 is enabled, the opposite phase from Schmitt trigger 13 will trigger integrating analog to digital converter 14 for a second cycling time. As shown by wave form 32, the second cycling time is equal in duration to the first cycling time. This second cycling time will run from times T4 to T5, starting in coincidence with the first negative crossing of interference signal 11 seen by Schmitt trigger 13 after time T3. This is shown as a positive going signal at output 34 of Schmitt trigger 13.

At time T5, timing signal 32 causes flip flop 27 to reverse again. The positive signal at output 27 enables gate 16. The negative going signal at output 37 of flip flop 27 disables gate 17 and will pass through gate 23 to revert flip flop 21 to its original condition, awaiting the next trigger pulse at trigger input 18 for another complete cycle and reading of the analog input signal at input terminal 11 as suggested by the second T1 reference. At this time output 31 of flip flop 21 has enabled a resetting of integrating analog to digital converter 14 which will occur according to the internal design of analog to digital converter 14.

It should be understood, of course, that the foregoing disclosure relates to only a preferred embodiment of the invention, and that it is intended to cover all changes and modifications of the example of the invention herein chosen for the purposes of the disclosure, which do not constitute departures from the spirit and scope of the invention.

We claim:

1. In combination integrating means, signal supplying means connected to said integrating means to supply analog signals thereto, said analog signals being of the form of a DC signal with AC signals superimposed thereon, bistable means connected to said signal supply in means, said bistable means effective to produce a pair of out-of-phase signals which change in response to said AC signals, gating means selectively supplying one of said pair of out-of-phase signals to said integrating means, start means connected to said integrating means and said gating means to control the operation thereof, and switching means connected from said integrating means to said gating means to selectively control which one of said pair of out-of-phase signals is applied to said integrating means via said gating means, said start means including means for supplying an initiating signal, first gate circuit means having an input connected to said means for supplying an initiating signal, flip-flop means having a pair of inputs and a pair of outputs, the output of said first gate circuit means connected to one input of said flip-flop means, one output of said flip-flop means connected to another input of said first gate means to selectively inhibit said first gate circuit means, second gate circuit means having an input connected to a second output of said flip-flop to selectively inhibit said second gate circuit means, the output of said second gate means connected to another input of said flip-flop means, and another input of said second gate circuit means connected to said switching means to selectively receive signals therefrom, said first output of said flip-flop means connected to said integrating means and said gating means to selectively control the operation thereof.

2. In combination, integrating means, signal supplying means connected to said integrating means to supply analog signals thereto, said analog signals being of the form of a DC signal with AC signals superimposed thereon, bistable means connected to said signal supplying means, said bistable means effective to produce a pair of out-of-phase signals which change in response to said AC signals, gating means selectively supplying one of said pair of out-of-phase signals to said integrating means, start means connected to said integrating means and said gating means to control the operation thereof, and switching means connected from said integrating means to said gating means to selectively control which one of said pair of out-of-phase signals is applied to said integrating means via said gating means, said switching means including, first and second gate circuit means, flip-flop means having a pair of inputs and a pair of outputs, one input of each of said first and second gate circuit means connected to said integrating means to receive a switching signal therefrom the output of each of said first and second gate circuit means each connected to a separate input of said flip-flop means.

3. In combination, integrating means, signal supplying means connected to said integrating means to supply analog signals thereto, said analog signals being of the form of a DC signal with AC signals superimposed thereon, bistable means connected to said signal supplying means, said bistable means effective to produce a pair of out-of-phase signals which change in response to said AC signals, gating means selectively supplying one of said pair of out-of-phase signals to said integrating means, start means connected to said integrating means and said gating means to control the operation thereof, and switching means connected from said integrating means to said gating means to selectively control which one of said pair of out-of-phase signals is applied to said integrating means via said gating means, said gating means including first and second gate circuit means each having one input connected to a separate output of said bistable means to receive said pair of out-of-phase signals produced by said bistable means, said first and second gate circuit means connected to said switching means to be selectively enabled thereby, third gate circuit means having one input thereof connected to the output of said first and second gate circuit means to receive the signals passed therethrough respectively when said first and second gate circuit means are enabled, other inputs of said third gate circuit means separately connected to said start means and said switching means respectively to selectively enable said third gate means to pass signals therethrough to said integrating means, fourth gate circuit means, said fourth gate circuit means having two inputs and one output, each of said inputs separately connected to the outputs of said first and second gate circuit means respectively, said output of said fourth gate connected to said one input of said third gate circuit means to supply a signal thereto in response to a signal from either of said first and second gate circuit means.

References Cited

UNITED STATES PATENTS 3,333,090 7/1967 Neer ------------ 235—183 X
3,185,820 5/1965 Williams et al. -------- 235—92

MAYNARD R. WILBUR, Primary Examiner

C. D. MILLER, Assistant Examiner